United States Patent
Tajima et al.

(10) Patent No.: US 6,547,985 B1
(45) Date of Patent: Apr. 15, 2003

(54) COMPOSITION OF 2-CYANOACRYLATE, LEWIS ACID METAL SALT AND CLATHRATE

(75) Inventors: Seitaro Tajima, Aichi (JP); Mitsuyoshi Sato, Aichi (JP)

(73) Assignee: Togosei Co., Ltd., Tokyo (JP)

( * ) Notice: Subject to any disclaimer, the term of this patent is extended or adjusted under 35 U.S.C. 154(b) by 0 days.

(21) Appl. No.: 09/545,609

(22) Filed: Apr. 7, 2000

(30) Foreign Application Priority Data

Apr. 7, 1999 (JP) .......................................... 11-100616

(51) Int. Cl.⁷ .......................... B32B 3/06; C08K 65/02; C08K 71/02; C08K 71/03
(52) U.S. Cl. ................. 252/182.12; 428/34.1; 428/133; 428/378; 428/447; 428/537.1; 528/396; 528/414; 528/416
(58) Field of Search .................. 526/310; 428/355 CN, 428/34.1, 133, 378, 447, 537.1; 252/182.12; 528/414, 416, 396

(56) References Cited

U.S. PATENT DOCUMENTS

| | | | | |
|---|---|---|---|---|
| 4,171,416 A | * | 10/1979 | Motegi et al. | 526/245 |
| 4,980,086 A | * | 12/1990 | Hiraiwa et al. | 252/511 |
| 5,290,825 A | | 3/1994 | Lazar | 523/176 |
| 6,294,629 B1 | * | 9/2001 | O'Dwyer et al. | 526/297 |

FOREIGN PATENT DOCUMENTS

| | | | | |
|---|---|---|---|---|
| EP | 142327 A1 | * | 5/1985 | |
| GB | 2268503 A | * | 1/1994 | |
| JP | 55-34165 B4 | * | 9/1980 | |
| JP | 60-115676 A | * | 6/1985 | |
| JP | 3-167279 A | * | 7/1991 | |

* cited by examiner

Primary Examiner—Robert E. L. Sellers
(74) Attorney, Agent, or Firm—Sughrue Mion, PLLC

(57) ABSTRACT

A 2-cyanoacrylate composition useful as an adhesive contains a Lewis acid metal salt which comprises a specific metal such as aluminum, gallium, indium or thallium, and the conjugate base of an acid having oxygen such as a monohalo-, dihalo or trihaloacetate, wherein the metal is bonded to the conjugate base through an oxygen atom, and a compound having clathrating ability such as a crown ether.

12 Claims, No Drawings

COMPOSITION OF 2-CYANOACRYLATE, LEWIS ACID METAL SALT AND CLATHRATE

FIELD OF THE INVENTION

The present invention relates to a 2-cyanoacrylate composition having excellent surface curability and clearance curability.

BACKGROUND OF THE INVENTION

2-Cyanoacrylate compositions undergo instantaneous anionicpolymerization to exhibit a high bonding strength. The compositions are hence widely utilized especially as instantaneous adhesives in various industrial fields.

However, it is not satisfactory to use the compositions as potting materials, fillers or instantaneous adhesives because the compositions necessitate a considerably prolonged setting time with respect to curability in a relatively wide gap between adherends (hereinafter referred to as "clearance curability") or curability on a surface of an adherent due to overflowing the composition (hereinafter referred to as "surface curability").

For overcoming the problem, various proposals have been made on the use of surface-treating agents which increase the curing rate of 2-cyanoacrylate compositions.

For example, JP-B-62-29471 (the term "JP-B" as used herein means an "examined Japanese patent publication") discloses a composition comprising an N,N-di(lower alkyl) toluidine, saccharin and ascorbic or isoascorbic acid, and JP-B-62-12279 discloses the use of a specific surfactant. JP-B-60-24826 discloses the use of methylolurea which may have been partly alkoxylated, melamine, or a derivative of either. JP-B-54-19416 and JP-B-51-25441 disclose a technique in which an adherend is treated beforehand with N,N-dimethyl-m-toluidine and with a vinyl ether or vinyl thioether, respectively. JP-B-49-12094 discloses a technique in which an adherend surface is treated with a liquid containing an amine, amide or imide, and JP-B-48-44175 discloses a technique in which an adherend surface is treated with a liquid containing a specific heterocyclic compound. JP-B-47-8718 discloses a technique in which an adherend surface is treated beforehand with a liquid containing dimethylaniline or/and tris[1-(2-methyl)aziridiyl]phosphine oxide. Furthermore, JP-A-39-844 (the term "JP-A" as used herein means an "unexamined published Japanese patent application") discloses a technique in which an adherend surface is treated beforehand with an epoxide or diepoxide.

Curing accelerators to be added to 2-cyanoacrylate compositions have also been investigated in order to improve curability. For example, U.S. Pat. No. 4,171,416 discloses the use of a crown ether compound as a curing accelerator. U.S. Pat. Nos. 4,170,585 and 4,377,490 disclose the use of a polyalkylene glycol derivative having a specific structure and a mixture of an aliphatic or aromatic polyol with an aliphatic or aromatic polyether, respectively, as a curing accelerator. U.S. Pat. Nos. 4,386,193 and 5,589,554 disclose the use of a three-, or four-arm polyol podand compound having a specific structure and a compound having cyano and carboxy groups, respectively, as a curing accelerator. Furthermore, JP-B-5-72946 and JP-A-7-316505 disclose the use of a calixarene compound and an organotitanium compound, respectively, as a curing accelerator.

It has further been attempted to improve surface curability and clearance curability by adding photocurability to a 2-cyanoacrylate composition. For example, JP-A-9-249708 discloses the use as an anionic photopolymerization initiator of a metallocene compound comprising a transition metal of Group VIII of the periodic table and aromatic electron system ligands. JP-A-6-299122 and International Publication WO 93/10483 disclose the use of an aromatic azide compound and an inorganic chromium complex, respectively, as an anionic photopolymerization initiator. Furthermore, JP-A-62-57475 discloses a cyanoacrylate-based adhesive composition containing a free-radical photopolymerization initiator.

However, the techniques described above each have had one or more disadvantages as will be described below, such as poor applicability, poor storage stability and the necessity of an illuminator. Namely, these techniques have been unsatisfactory because the advantage inherent in 2-cyanoacrylate compositions, that the operation can be completed in a short period of time, is lost.

The technique in which a surface-treating agent is used is satisfactory in attaining a shortened operation period because it greatly improves surface curability and clearance curability. However, applicability is considerably impaired because two liquids should be applied.

Although the technique in which a curing accelerator is used is effective in improving curability in application to closely spaced adherends, it has been unsatisfactory in surface curability and clearance curability.

The technique in which photocurability is added is satisfactory in operation period because it can improve surface curability and clearance curability. However, this technique has been unsatisfactory in that it necessitates a light irradiation device and that it is unusable for the bonding of adherends having such a structure that irradiation of the bonding surface with light is impossible.

Namely, there has been a desire since long before for a 2-cyanoacrylate composition which is usable as one component and curable at ambient temperature, and not necessitating a light irradiation device or the like and which cures in a short period of time even in the case where it is used as a potting material, or has overflowed, or is applied to a relatively wide gap between adherends.

SUMMARY OF THE INVENTION

The present invention has been made to overcome the above-described disadvantages in the conventional techniques.

Accordingly, an object of the present invention is to provide a 2-cyanoacrylate composition having excellent surface curability and clearance curability and being effective in shortening the time required for bonding operation.

As a result of intensive investigations to overcome the above-described conventional problems, it has been found that all the above-described problems are overcome and surface curability and clearance curability are greatly improved by containing a Lewis acid metal salt comprising a specific metal and a conjugate base comprising an acid having oxygen, and a compound having clathrating ability into a 2-cyanoacrylate. The present invention has been completed based on this finding.

The present invention provides a 2-cyanoacrylate composition comprising (1) a Lewis acid metal salt which comprises a metal selected from the group consisting of zinc, cadmium, mercury, aluminum, gallium, indium and thallium (hereinafter, the metal is referred to as "specific metal") and a conjugate base comprising an acid having oxygen, wherein the metal is bonded to the conjugate base through an oxygen atom, and (2) a compound having clathrating ability.

In connection with the incorporation of a Lewis acid metal salt into a 2-cyanoacrylate, JP-W-63-500247 (the term "JP-W" as used herein means an "unexamined published PCT application") discloses a technique in which a metal salt such as $FeCl_3$ or $CdCl_2$ is incorporated as an inhibitor into a 2-cyanoacrylate. However, those metal salts, in which the central atom is directly bonded to halogen atoms, have an exceedingly high acidity and are utterly different from the Lewis acid metal salt used in the present invention, which is intended to improve curing rate. Furthermore, JP-A-62-89780 discloses a technique in which an electroconductive powder of, e.g., silver, copper, nickel or aluminum is incorporated into a cyanoacrylate together with a basic substance such as a crown ether. However, those metals used in this technique are solid and remain undissolved in the cyanoacrylate. This technique therefore is utterly different from the invention, in which the metal salt used is soluble in cyanoacrylates.

DETAILED DESCRIPTION OF THE INVENTION

Lewis Acid Metal Salt

The Lewis acid metal salt used in the present invention is a metal salt which is capable of accepting an electron pair and contains a specific metal. The Lewis acid metal salt used in the present invention comprises the specific metal and the conjugate base of either a specific organic acid or perchloric acid, wherein the specific metal must be bonded to an oxygen atom of the conjugate base.

The conjugate base does not contain any functional group which initiates polymerization of 2-cyanoacrylate, such as amino group or mercapto group. Although the base may be an anhydride or a hydrate, it is a normal salt. A basic salt is not included in the definition of the Lewis acid metal salt used in the present invention.

Preferred examples of the acid used for forming the conjugate base include (1) perchloric acid, (2) an aliphatic carboxylic acid, an aromatic carboxylic acid, an aliphatic sulfonic acid or an aromatic sulfonic acid, and (3) an aliphatic carboxylic acid, an aromatic carboxylic acid, an aliphatic sulfonic acid or an aromatic sulfonic acid, each being substituted with one or more halogen atoms or one or more cyano or alkyl groups. The conjugate base derived from any of those acids is effective in accomplishing the object of the present invention.

Specific examples of the Lewis acid metal salt used in the present invention are listed below, but the metal salt is not limited to those.

Lewis Acid Metal Salt Containing Zinc

Examples of the Lewis acid metal salt containing zinc include zinc acetate, zinc monofluoroacetate, zinc difluoroacetate, zinc trifluoroacetate, zinc monochloroacetate, zinc dichloroacetate, zinc trichloroacetate, zinc monobromoacetate, zinc dibromoacetate, zinc tribromoacetate, zinc monoiodoacetate, zinc diiodoacetate, zinc triiodoacetate, zinc cyanoacetate, zinc propionate, zinc α-fluoropropionate, zinc β-fluoropropionate, zinc α,α'-difluoropropionate, zinc α,β-difluoropropionate, zinc β,β'-difluoropropionate, zinc α-chloropropionate, zinc β-chloropropionate, zinc α,α'-dichloropropionate, zinc α,β-dichloropropionate, zinc β,β'-dichloropropionate, zinc α-bromopropionate, zinc β-bromopropionate, zinc α,α'-dibromopropionate, zinc α,β-dibromopropionate, zinc β,β'-dibromopropionate, zinc α-iodopropionate, zinc β-iodopropionate, zinc α,α'-diiodopropionate, zinc α,β-diiodopropionate, zinc β,β'-diiodopropionate, zinc β,β,β-triiodopropionate, zinc butyrate, zinc isobutyrate, zinc valerate, zinc caproate, zinc heptanoate, zinc caprylate, zinc 2-ethylhexanoate, zinc acrylate, zinc α-fluoroacrylate, zinc β-fluoroacrylate, zinc α-chloroacrylate, zinc β-chloroacrylate, zinc α,β-dichloroacrylate, zinc β,β'-dichloroacrylate, zinc α-bromoacrylate, zinc β-bromoacrylate, zinc α,β-dibromoacrylate, zinc β,β,'-dibromoacrylate, zinc tribromoacrylate, zinc α-iodoacrylate, zinc β-iodoacrylate, zinc α,β-diiodoacrylate, zinc β,β'-diiodoacrylate, zinc crotonate, zinc α-chlorocrotonate, zinc β-chlorocrotonate, zinc γ-chlorocrotonate, zinc α-bromocrotonate, zinc β-bromocrotonate, zinc γ-bromocrotonate, zinc α,β-dichlorocrotonate, zinc α,β-dibromocrotonate, zinc γ,γ,γ-trichlorocrotonate, zinc methacrylate, zinc β-bromomethacrylate, zinc formate, zinc chloroformate, zinc cyclopentanecarboxylate, zinc 1-methylcyclopentanecarboxylate, zinc 2-methylcyclopentanecarboxylate, zinc 3-methylcyclopentanecarboxylate, zinc cyclohexanecarboxylate, zinc 1-methylcyclohexanecarboxylate, zinc 2-methylcyclohexanecarboxylate, zinc 3-methylcyclohexanecarboxylate, zinc 4-methylcyclohexanecarboxylate, zinc 1,3-dimethylcyclohexanecarboxylate, zinc 2,2-dimethylcyclohexanecarboxylate, zinc 2,4-dimethylcyclohexanecarboxylate, zinc 1,2-chlorocyclohexanecarboxylate, zinc 2-chlorocyclohexanecarboxylate, zinc 1-bromocyclohexanecarboxylate, zinc 2-bromocyclohexanecarboxylate, zinc 3-bromocyclohexanecarboxylate, zinc 1,2-dibromocyclohexanecarboxylate, zinc cyclohexylacetate, zinc 1-methylcyclohexylacetate, zinc 2,2-dimethylcyclohexylacetate, zinc 1-cyclohexenecarboxylate, zinc 2-cyclohexenecarboxylate, zinc 3-cyclohexenecarboxylate, zinc cycloheptanecarboxylate, zinc 1-cycloheptenecarboxylate, zinc cyclooctanecarboxylate, zinc 2-methylbenzoate, zinc 3-methylbenzoate, zinc 4-methylbenzoate, zinc 2-ethylbenzoate, zinc 3-ethylbenzoate, zinc 4-ethylbenzoate, zinc 2,3-dimethylbenzoate, zinc 2,4-dimethylbenzoate, zinc 2,5-dimethylbenzoate, zinc 2,6-dimethylbenzoate, zinc 3,4-dimethylbenzoate, zinc 3,5-dimethylbenzoate, zinc 2,3,4-trimethylbenzoate, zinc 2,3,5-trimethylbenzoate, zinc 2,3,6-trimethylbenzoate, zinc 2,4,6-trimethylbenzoate, zinc 3,4,5-trimethylbenzoate, zinc cuminate, zinc 2,3,4,5-tetramethylbenzoate, zinc 2,3,5,6-tetramethylbenzoate, zinc pentamethylbenzoate, zinc 2-chlorobenzoate, zinc cinnamate, zinc 2-cyanobenzoate, zinc naphthalene-1-carboxylate, zinc 2-methylnaphthalene-1-carboxylate, zinc 4-methyl naphthalene-1-carboxylate, zinc 5-methylnaphthalene-1-carboxylate, zinc 6-methylnaphthalene-1-carboxylate, zinc 7-methylnaphthalene-1-carboxylate, zinc 8-methylnaphthalene-1-carboxylate, zinc naphthalene-2-carboxylate, zinc 1-methylnaphthalene-2-carboxylate, zinc 4-methylnaphthalene-2-carboxylate, zinc 5-methylnaphthalene-2-carboxylate, zinc 6-methylnaphthalene-2-carboxylate, zinc 8-methylnaphthalene-2-carboxylate, zinc 5-chloronaphthalene-1-carboxylate, zinc 7-chloronaphthalene-1-carboxylate, zinc 8-chloronaphthalene-1-carboxylate, zinc 4-bromonaphthalene-1-carboxylate, zinc 5-bromonaphthalene-1-carboxylate, zinc 7-bromonaphthalene-1-carboxylate, zinc 8-bromonaphthalene-1-carboxylate, zinc 8-iodonaphthalene-1-carboxylate, zinc 1-chloronaphthalene-2-carboxylate, zinc 3-chloronaphthalene-2-carboxylate, zinc 5-chloronaphthalene-2-carboxylate, zinc 5-bromonaphthalene-2-carboxylate, zinc 3-iodonaphthalene-2-carboxylate, zinc benzenesulfonate, zinc 2-toluenesulfonate, zinc 3-toluenesulfonate, zinc 4-toluenesulfonate, zinc o-xylene-4-sulfonate, zinc m-xylene-4-sulfonate, zinc p-xylene-4-sulfonate, zinc 4-fluorobenzenesulfonate, zinc 2-chlorobenzenesulfonate, zinc 3-chlorobenzenesulfonate, zinc 4-chlorobenzenesulfonate, zinc 2,4-dichlorobenzenesulfonate, zinc 2-bromobenzenesulfonate, zinc 3-bromobenzenesulfonate, zinc 4-bromobenzenesulfonate, zinc 2,5-dibromobenzenesulfonate, zinc 3,4-dibromobenzenesulfonate, zinc 2-iodobenzenesulfonate, zinc 3-iodobenzenesulfonate, zinc 4-iodobenzenesulfonate, zinc methanesulfonate, zinc ethanesulfonate, zinc propanesulfonate, zinc butanesulfonate, zinc pentanesulfonate, zinc hexanesulfonate, zinc heptanesulfonate, zinc octanesulfonate, zinc trifluoromethanesulfonate, zinc pentafluoroethanesulfonate, zinc heptafluoropropanesulfonate, zinc perfluorobutanesulfonate, zinc perfluoropentanesulfonate, zinc perfluorohexanesulfonate, zinc perfluorooctanesulfonate, zinc perchlorate, and the anhydrides and hydrates of those salts.

Lewis Acid Metal Salt Containing Cadmium

Examples of the Lewis acid metal salt containing cadmium include cadmium acetate, cadmium monofluoroacetate, cadmium difluoroacetate, cadmium trifluoroacetate, cadmium monochloroacetate, cadmium dichloroacetate, cadmium trichloroacetate, cadmium monobromoacetate, cadmium dibromoacetate, cadmium tribromoacetate, cadmium monoiodoacetate, cadmium diiodoacetate, cadmium triiodoacetate, cadmium cyanoacetate, cadmium propionate, cadmium α-fluoropropionate, cadmium β-fluoropropionate, cadmium α,α'-difluoropropionate, cadmium α,β-difluoropropionate, cadmium β,β'-difluoropropionate, cadmium α-chloropropionate, cadmium β-chloropropionate, cadmium α,α'-dichloropropionate, cadmium α,β-dichloropropionate, cadmium β,β'-dichhlropropionate, cadmium α,β-bromopropionate, cadmium β-bromopropionate, cadmium α,α'-dibromopropionate, cadmium α,β-dibromopropionate, cadmium β,β'-dibromopropionate, cadmium α-iodopropionate, cadmium β-iodopropionate, cadmium α,α'-diiodopropionate, cadmium α,β-diiodopropionate, cadmium β,β'-diiodopropionate, cadmium β,β,β-triiodopropionate, cadmium butyrate, cadmium isobutyrate, cadmium valerate, cadmium caproate, cadmium heptanoate, cadmium caprylate, cadmium 2-ethylhexanoate, cadmium acrylate, cadmium α-fluoroacrylate, cadmium β-fluoroacrylate, cadmium α-chloroacrylate, cadmium β-chloroacrylate, cadmium α,β-dichloroacrylate, cadmium β,β'-dichloroacrylate, cadmium α-bromoacrylate, cadmium β-bromoacrylate, cadmium α,β-dibromoacrylate, cadmium β,β'-dibromoacrylate, cadmium tribromoacrylate, cadmium α-iodoacrylate, cadmium β-iodoacrylate, cadmium α,β-diiodoacrylate, cadmium β,β'-diiodoacrylate, cadmium crotonate, cadmium α-chlorocrotonate, cadmium β-chlorocrotonate, cadmium γ-chlorocrotonate, cadmium α-bromocrotonate, cadmium β-bromocrotonate, cadmium γ-bromocrotonate, cadmium α,β-dichlorocrotonate, cadmium α,β-dibromocrotonate, cadmium γ,γ,γ-trichlorocrotonate, cadmium methacrylate, cadmium β-bromomethacrylate, cadmium formate, cadmium chloroformate, cadmium cyclopentanecarboxylate, cadmium 1-methylcyclopentanecarboxylate, cadmium 2-methylcyclopentanecarboxylate, cadmium 3-methylcyclopentanecarboxylate, cadmium cyclohexanecarboxylate, cadmium 1-methylcyclohexanecarboxylate, cadmium 2-methylcyclohexanecarboxylate, cadmium 3-methylcyclohexanecarboxylate, cadmium 4-methylcyclohexanecarboxylate, cadmium 1,3-dimethylcyclohexanecarboxylate, cadmium 2,2-dimethylcyclohexanecarboxylate, cadmium 2,4-dimethylcyclohexanecarboxylate, cadmium 1-chlorocyclohexanecarboxylate, cadmium 2-chlorocyclohexanecarboxylate, cadmium 1-bromocyclohexanecarboxylate, cadmium 2-bromocyclohexanecarboxylate, cadmium 3-bromocyclohexanecarboxylate, cadmium 1,2-dibromocyclohexanecarboxylate, cadmium cyclohexylacetate, cadmium 1-methylcyclohexylacetate, cadmium 2,2-dimethylcyclohexylacetate, cadmium 1-cyclohexenecarboxylate, cadmium 2-cyclohexenecarboxylate, cadmium 3-cyclohexenecarboxylate, cadmium cycloheptanecarboxylate, cadmium 1-cycloheptenecarboxylate, cadmium cyclooctanecarboxylate, cadmium 2-methylbenzoate, cadmium 3-methylbenzoate, cadmium 4-methylbenzoate, cadmium 2-ethylbenzoate, cadmium 3-ethylbenzoate, cadmium 4-ethylbenzoate, cadmium 2,3-dimethylbenzoate, cadmium 2,4-dimethylbenzoate, cadmium 2,5-dimethylbenzoate, cadmium 2,6-dimethylbenzoate, cadmium 3,4-dimethylbenzoate, cadmium 3,5-dimethylbenzoate, cadmium 2,3,4-trimethylbenzoate, cadmium 2,3,5-trimethylbenzoate, cadmium 2,3,6-trimethylbenzoate, cadmium 2,4,6-trimethylbenzoate, cadmium 3,4,5-trimethylbenzoate, cadmium cuminate, cadmium 2,3,4,5-tetramethylbenzoate, cadmium 2,3,5,6-tetramethylbenzoate, cadmium pentamethylbenzoate, cadmium 2-chlorobenzoate, cadmium cinnamate, cadmium 2-cyanobenzoate, cadmium naphthalene-1-carboxylate, cadmium 2-methylnaphthalene-1-carboxylate, cadmium 4-methylnaphthalene-1-carboxylate, cadmium 5-methylnaphthalene-1-carboxylate, cadmium 6-methylnaphthalene-1-carboxylate, cadmium 7-methylnaphthalene-1-carboxylate, cadmium 8-methylnaphthalene-1-carboxylate, cadmium naphthalene-2-carboxylate, cadmium 1-methylnaphthalene-2-carboxylate, cadmium 4-methylnaphthalene-2-carboxylate, cadmium 5-methylnaphthalene-2-carboxylate, cadmium 6-methylnaphthalene-2-carboxylate, cadmium 8-methylnaphthalene-2-carboxylate, cadmium 5-chloronaphthalene-1-carboxylate, cadmium 7-chloronaphthalene-1-carboxylate, cadmium 8-chloronaphthalene-1-carboxylate, cadmium 4-bromonaphthalene-1-carboxylate, cadmium 5-bromonaphthalene-1-carboxylate, cadmium 7-bromonaphthalene-1-carboxylate, cadmium 8-bromonaphthalene-1-carboxylate, cadmium 8-iodonaphthalene-1-carboxylate, cadmium 1-chloronaphthalene-2-carboxylate, cadmium 3-chloronaphthalene-2-carboxylate, cadmium 5-chloronaphthalene-2-carboxylate, cadmium 5-bromonaphthalene-2-carboxylate, cadmium 3-iodonaphthalene-2-carboxylate, cadmium benzenesulfonate, cadmium 2-toluenesulfonate, cadmium 3-toluenesulfonate, cadmium 4-toluenesulfonate, cadmium o-xylene-4-sulfonate, cadmium m-xylene-4-sulfonate, cadmium p-xylene-4-sulfonate, cadmium 4-fluorobenzenesulfonate, cadmium 2-chlorobenzenesulfonate, cadmium 3-chlorobenzenesulfonate, cadmium 4-chlorobenzenesulfonate, cadmium 2,4-dichlorobenzenesulfonate, cadmium 2-bromobenzenesulfonate, cadmium 3-bromobenzenesulfonate, cadmium 4-bromobenzenesulfonate, cadmium 2,5-dibromobenzenesulfonate, cadmium 3,4-dibromobenzenesulfonate, cadmium 2-iodobenzenesulfonate, cadmium 3-iodobenzenesulfonate, cadmium 4-iodobenzenesulfonate, cadmium methanesulfonate, cadmium ethanesulfonate, cadmium propanesulfonate, cadmium butanesulfonate, cadmium pentanesulfonate, cadmium hexanesulfonate, cadmium heptanesulfonate, cadmium octanesulfonate, cadmium trifluoromethanesulfonate, cadmium pentafluoroethanesulfonate, cadmium heptafluoropropanesulfonate, cadmium perfluorobutanesulfonate, cadmium perfluoropentanesulfonate, cadmium perfluorohexanesulfonate, cadmium perfluorooctanesulfonate, cadmium perchlorate, and the anhydrides and hydrates of those salts.

Lewis Acid Metal Salt Containing Mercury

Examples of the Lewis acid metal salt containing mercury include mercury acetate, mercury monofluoroacetate, mercury difluoroacetate, mercury trifluoroacetate, mercury monochloroacetate, mercury dichloroacetate, mercury trichloroacetate, mercury monobromoacetate, mercury dibromoacetate, mercury tribromoacetate, mercury monoiodoacetate, mercury diiodoacetate, mercury triiodoacetate, mercury cyanoacetate, mercury propionate, mercury α-fluoropropionate, mercury β-fluoropropionate, mercury α,α'-difluoropropionate, mercury α,β-difluoropropionate, mercury β,β'-difluoropropionate, mercury α-chloropropionate, mercury β-chloropropionate, mercury α,α'-dichloropropionate, mercury α,β-dichloropropionate, mercury β,β'-dichloropropionate, mercury α-bromopropionate, mercury β-bromopropionate, mercury α,α'-dibromopropionate, mercury α,β-dibromopropionate, mercury β,β'-dibromopropionate, mercury α-iodopropionate, mercury β-iodopropionate, mercury , α,α'-diiodopropionate, mercury α,β-diiodopropionate, mercury β,β'-diiodopropionate, mercury β,β,β-triiodopropionate, mercury butyrate, mercury isobutyrate, mercury valerate, mercury caproate, mercury heptanoate, mercury caprylate, mercury 2-ethylhexanoate, mercury acrylate, mercury α-fluoroacrylate, mercury β-fluoroacrylate, mercury α-chloroacrylate, mercury β-chloroacrylate, mercury α,β-dichloroacrylate, mercury β,β'-dichloroacrylate, mercury α-bromoacrylate, mercury β-bromoacrylate, mercury α,β-dibromoacrylate, mercury β,β'-dibromoacrylate, mercury tribromoacrylate, mercury α-iodoacrylate, mercury β-iodoacrylate, mercury α,β-diiodoacrylate, mercury β,β'-diiodoacrylate, mercury crotonate, mercury α-chlorocrotonate, mercury β-chlorocrotonate, mercury γ-chlorocrotonate, mercury α-bromocrotonate, mercury β-bromocrotonate, mercury γ-bromocrotonate, mercury α,β-dichlorocrotonate, mercury α,β-dibromocrotonate, mercury γ,γ,γ-trichlorocrotonate, mercury methacrylate, mercury β-bromomethacrylate, mercury formate, mercury chloroformate, mercury cyclopentanecarboxylate, mercury 1-methylcyclopentanecarboxylate, mercury 2-methylcyclopentanecarboxylate, mercury 3-methylcyclopentanecarboxylate, mercury cyclohexanecarboxylate, mercury 1-methylcyclohexanecarboxylate, mercury 2-methylcyclohexanecarboxylate, mercury 3-methylcyclohexanecarboxylate, mercury 4-methylcyclohexanecarboxylate, mercury 1,3-dimethylcyclohexanecarboxylate, mercury 2,2-dimethylcyclohexanecarboxylate, mercury 2,4-dimethylcyclohexanecarboxylate, mercury 1-chlorocyclohexanecarboxylate, mercury 2-chlorocyclohexanecarboxylate, mercury 1-bromocyclohexanecarboxylate, mercury 2-bromocyclohexanecarboxylate, mercury 3-bromocyclohexanecarboxylate, mercury 1,2-dibromocyclohexanecarboxylate, mercury cyclohexylacetate, mercury 1-methylcyclohexylacetate, mercury 2,2-dimethylcyclohexylacetate, mercury 1-cyclohexenecarboxylate, mercury 2-cyclohexenecarboxylate, mercury 3-cyclohexenecarboxylate, mercury cycloheptanecarboxylate, mercury 1-cycloheptenecarboxylate, mercury cyclooctanecarboxylate, mercury 2-methylbenzoate, mercury 3-methylbenzoate, mercury 4-methylbenzoate, mercury 2-ethylbenzoate, mercury 3-ethylbenzoate, mercury 4-ethylbenzoate, mercury 2,3-dimethylbenzoate, mercury 2,4-dimethylbenzoate, mercury 2,5-dimethylbenzoate, mercury 2,6-dimethylbenzoate, mercury 3,4-dimethylbenzoate, mercury 3,5-dimethylbenzoate, mercury 2,3,4-trimethylbenzoate, mercury 2,3,5-trimethylbenzoate, mercury 2,3,6-trimethylbenzoate, mercury 2,4,6-trimethylbenzoate, mercury 3,4,5-trimethylbenzoate, mercury cuminate, mercury 2,3,4,5-tetramethylbenzoate, mercury 2,3,5,6-tetramethylbenzoate, mercury pentamethylbenzoate, mercury 2-chlorobenzoate, mercury cinnamate, mercury 2-cyanobenzoate, mercury naphthalene-1-carboxylate, mercury 2-methylnaphthalene-1-carboxylate, mercury 4-methylnaphthalene-1-carboxylate, mercury 5-methylnaphthalene-1-carboxylate, mercury 6-methylnaphthalene-1-carboxylate, mercury 7-methylnaphthalene-1-carboxylate, mercury 8-methylnaphthalene-1-carboxylate, mercury naphthalene-2-carboxylate, mercury 1-methylnaphthalene-2-carboxylate, mercury 4-methylnaphthalene-2-carboxylate, mercury 5-methylnaphthalene-2-carboxylate, mercury 6-methylnaphthalene-2-carboxylate, mercury 8-methylnaphthalene-2-carboxylate, mercury 5-chloronaphthalene-1-carboxylate, mercury 7-chloronaphthalene-1-carboxylate, mercury 8-chloronaphthalene-1-carboxylate, mercury 4-bromonaphthalene-1-carboxylate, mercury 5-bromonaphthalene-1-carboxylate, mercury 7-bromonaphthalene-1-carboxylate, mercury 8-bromonaphthalene-1-carboxylate, mercury 8-iodonaphthalene-1-carboxylate, mercury 1-chloronaphthalene-2-carboxylate, mercury 3-chloronaphthalene-2-carboxylate, mercury 5-chloronaphthalene-2-carboxylate, mercury 5-bromonaphthalene-2-carboxylate, mercury 3-iodonaphthalene-2-carboxylate, mercury benzenesulfonate, mercury 2-toluenesulfonate, mercury 3-toluenesulfonate, mercury 4-toluenesulfonate, mercury o-xylene-4-sulfonate, mercury m-xylene-4-sulfonate, mercury p-xylene-4-sulfonate, mercury 4-fluorobenzenesulfonate, mercury 2-chlorobenzenesulfonate, mercury 3-chlorobenzenesulfonate, mercury 4-chlorobenzenesulfonate, mercury 2,4-dichlorobenzenesulfonate, mercury 2-bromobenzenesulfonate, mercury 3-bromobenzenesulfonate, mercury 4-bromobenzenesulfonate, mercury 2,5-dibromobenzenesulfonate, mercury 3,4-dibromobenzenesulfonate, mercury 2-iodobenzenesulfonate, mercury 3-iodobenzenesulfonate, mercury 4-iodobenzenesulfonate, mercury methanesulfonate, mercury ethanesulfonate, mercury propanesulfonate, mercury butanesulfonate, mercury pentanesulfonate, mercury hexanesulfonate, mercury heptanesulfonate, mercury octanesulfonate, mercury trifluoromethanesulfonate, mercury pentafluoroethanesulfonate, mercury heptafluoropropanesulfonate, mercury perfluorobutanesulfonate, mercury perfluoropentanesulfonate, mercury perfluorohexanesulfonate, mercury perfluorooctanesulfonate, mercury perchlorate, and the anhydrides and hydrates of those salts.

Lewis Acid Metal Salt Containing Aluminum

Examples of the Lewis-acid metal salt containing aluminum include aluminum acetate, aluminum monofluoroacetate, aluminum difluoroacetate, aluminum trifluoroacetate, aluminum monochloroacetate, aluminum dichloroacetate, aluminum trichloroacetate, aluminum monobromoacetate, aluminum dibromoacetate, aluminum tribromoacetate, aluminum monoiodoacetate, aluminum diiodoacetate, aluminum triiodoacetate, aluminum cyanoacetate, aluminum propionate, aluminum α-fluoropropionate, aluminum β-fluoropropionate, aluminum α,α'-difluoropropionate, aluminum α,β-difluoropropionate, aluminum β,β'-difluoropropionate, aluminum α-chloropropionate, aluminum β-chloropropionate, aluminum α,α'-dichloropropionate, aluminum α,β-dichloropropionate, aluminum β,β'-dichloropropionate, aluminum α-bromopropionate, aluminum β-bromopropionate, aluminum α,α'-dibromopropionate, aluminum α,β-dibromopropionate, aluminum β,β'-dibromopropionate, aluminum α-iodopropionate, aluminum -iodopropionate, aluminum α,α'-diiodopropionate, aluminum α,β-diiodopropionate, aluminum β,β'-diiodopropionate, aluminum β,β,β-triiodopropionate, aluminum butyrate, aluminum isobutyrate, aluminum valerate, aluminum caproate, aluminum heptanoate, aluminum caprylate, aluminum 2-ethylhexanoate, aluminum acrylate, aluminum α-fluoroacrylate, aluminum β-fluoroacrylate, aluminum α-chloroacrylate, aluminum β-chloroacrylate, aluminum α,β-dichloroacrylate, aluminum β,β'-dichloroacrylate, aluminum α-bromoacrylate, aluminum β-bromoacrylate, aluminum α,β-dibromoacrylate, aluminum β,β'-dibromoacrylate, aluminum tribromoacrylate, aluminum α-iodoacrylate, aluminum β-iodoacrylate, aluminum α,β-diiodoacrylate, aluminum β,β'-diiodoacrylate, aluminum crotonate, aluminum α-chlorocrotonate, aluminum β-chlorocrotonate, aluminum γ-chlorocrotonate, aluminum α-bromocrotonate, aluminum β-bromocrotonate, aluminum γ-bromocrotonate, aluminum α,β-dichlorocrotonate, aluminum α,β-dibromocrotonate, aluminum γ,γ,γ-trichlorocrotonate, aluminum methacrylate, aluminum β-bromomethacrylate, aluminum formate, aluminum chloroformate, aluminum cyclopentanecarboxylate, aluminum 1-methylcyclopentanecarboxylate, aluminum 2-methylcyclopentanecarboxylate, aluminum 3-methylcyclopentanecarboxylate, aluminum cyclohexanecarboxylate, aluminum 1-methylcyclohexanecarboxylate, aluminum 2-methylcyclohexanecarboxylate, aluminum 3-methylcyclohexanecarboxylate, aluminum 4-methylcyclohexanecarboxylate, aluminum 1,3-dimethylcyclohexanecarboxylate, aluminum 2,2-dimethylcyclohexanecarboxylate, aluminum 2,4-dimethylcyclohexanecarboxylate, aluminum 1-chlorocyclohexanecarboxylate, aluminum 2-chlorocyclohexanecarboxylate, aluminum 1-bromocyclohexanecarboxylate, aluminum 2-bromocyclohexanecarboxylate, aluminum 3-bromocyclohexanecarboxylate, aluminum 1,2-dibromocyclohexanecarboxylate, aluminum cyclohexylacetate, aluminum 1-methylcyclohexylacetate, aluminum 2,2-dimethylcyclohexylacetate, aluminum 1-cyclohexenecarboxylate, aluminum 2-cyclohexenecarboxylate, aluminum 3-cyclohexenecarboxylate, aluminum cycloheptanecarboxylate, aluminum 1-cycloheptenecarboxylate, aluminum cyclooctanecarboxylate, aluminum 2-methylbenzoate, aluminum 3-methylbenzoate, aluminum 4-methylbenzoate, aluminum 2-ethylbenzoate, aluminum 3-ethylbenzoate, aluminum 4-ethylbenzoate, aluminum 2,3-dimethylbenzoate, aluminum 2,4-dimethylbenzoate, aluminum 2,5-dimethylbenzoate, aluminum 2,6-dimethylbenzoate, aluminum 3,4-dimethylbenzoate, aluminum 3,5-dimethylbenzoate, aluminum 2,3,4-trimethylbenzoate, aluminum 2,3,5-trimethylbenzoate, aluminum 2,3,6-trimethylbenzoate, aluminum 2,4,6-trimethylbenzoate, aluminum 3,4,5-trimethylbenzoate, aluminum cuminate, aluminum 2,3,4,5-tetramethylbenzoate, aluminum 2,3,5,6-tetramethylbenzoate, aluminum pentamethylbenzoate, aluminum 2-chlorobenzoate, aluminum cinnamate, aluminum 2-cyanobenzoate, aluminum naphthalene-1-carboxylate, aluminum 2-methylnaphthalene-1-carboxylate, aluminum 4-methylnaphthalene-1-carboxylate, aluminum 5-methylnaphthalene-1- carboxylate, aluminum 6-methylnaphthalene-1-carboxylate, aluminum 7-methylnaphthalene-1-carboxylate, aluminum 8-methylnaphthalene-1-carboxylate, aluminum naphthalene-2-carboxylate, aluminum 1-methylnaphthalene-2-carboxylate, aluminum 4-methylnaphthalene-2-carboxylate, aluminum 5-methylnaphthalene-2-carboxylate, aluminum 6-methylnaphthalene-2-carboxylate, aluminum 8-methylnaphthalene-2-carboxylate, aluminum 5-chloronaphthalene-1-carboxylate, aluminum 7-chloronaphthalene-1-carboxylate, aluminum 8-chloronaphthalene-1-carboxylate, aluminum 4-bromonaphthalene-1-carboxylate, aluminum 5-bromonaphthalene-1-carboxylate, aluminum 7-bromonaphthalene-1-carboxylate, aluminum 8-bromonaphthalene-1-carboxylate, aluminum 8-iodonaphthalene-1-carboxylate, aluminum 1-chloronaphthalene-2-carboxylate, aluminum 3-chloronaphthalene-2-carboxylate, aluminum 5-chloronaphthalene-2-carboxylate, aluminum 5-bromonaphthalene-2-carboxylate, aluminum 3-iodonaphthalene-2-carboxylate, aluminum benzenesulfonate, aluminum 2-toluenesulfonate, aluminum 3-toluenesulfonate, aluminum 4-toluenesulfonate, aluminum o-xylene-4-sulfonate, aluminum m-xylene-4-sulfonate, aluminum p-xylene-4-sulfonate, aluminum 4-fluorobenzenesulfonate, aluminum 2-chlorobenzenesulfonate, aluminum 3-chlorobenzenesulfonate, aluminum 4-chlorobenzenesulfonate, aluminum 2,4-dichlorobenzenesulfonate, aluminum 2-bromobenzenesulfonate, aluminum 3-bromobenzenesulfonate, aluminum 4-bromobenzenesulfonate, aluminum 2,5-dibromobenzenesulfonate, aluminum 3,4-dibromobenzenesulfonate, aluminum 2-iodobenzenesulfonate, aluminum 3-iodobenzenesulfonate, aluminum 4-iodobenzenesulfonate, aluminum methanesulfonate, aluminum ethanesulfonate, aluminum propanesulfonate, aluminum butanesulfonate, aluminum pentanesulfonate, aluminum hexanesulfonate, aluminum heptanesulfonate, aluminum octanesulfonate, aluminum trifluoromethanesulfonate, aluminum pentafluoroethanesulfonate, aluminum heptafluoropropanesulfonate, aluminum perfluorobutanesulfonate, aluminum perfluoropentanesulfonate, aluminum perfluorohexanesulfonate, aluminum perfluorooctanesulfonate, aluminum perchlorate, and the anhydrides and hydrates of those salts.

Lewis Acid Metal Salt Containing Gallium

Examples of the Lewis acid metal salt containing gallium include gallium acetate, gallium monofluoroacetate, gallium difluoroacetate, gallium trifluoroacetate, gallium monochloroacetate, gallium dichloroacetate, gallium trichoroacetate, gallium monobromoacetate, gallium dibromoacetate, gallium tribromoacetate, gallium monoiodoacetate, gallium diiodoacetate, gallium triodoacetate, gallium cyanoacetate, gallium propionate, gallium α-fluoropropionate, gallium β-fluoropropionate, gallium α,α'-difluoropropionate, gallium α,β-difluoropropionate, gallium β,β'-difluoropropionate, gallium α-chloropropionate, gallium β-chloropropionate, gallium α,α'-dichloropropionate, gallium α,β-dichloropropionate, gallium β,β'-dichloropropionate, gallium α-bromopropionate, gallium β-bromopropionate, gallium α,α'-dibromopropionate, gallium α,β-dibromopropionate, gallium β,β'-dibromopropionate, gallium α-iodopropionate, gallium β-iodopropionate, gallium α,α'-diiodopropionate, gallium α,β-diiodopropionate, gallium β,β'-diiodopropionate, gallium β,β,β-triiodopropionate, gallium butyrate, gallium isobutyrate, gallium valerate, gallium caproate, gallium heptanoate, gallium caprylate, gallium 2-ethylhexanoate, gallium acrylate, gallium α-fluoroacrylate, gallium β-fluoroacrylate, gallium α-chloroacrylate, gallium β-chloroacrylate, gallium α,β-dichloroacrylate, gallium β,β'-dichloroacrylate, gallium α-bromoacrylate, gallium β-bromoacrylate, gallium α,β-dibromoacrylate, gallium β,β'-dibromoacrylate, gallium tribromoacrylate, gallium α-iodoacrylate, gallium β-iodoacrylate, gallium α,β-iodoacrylate, gallium β,β'-diiodoacrylate, gallium crotonate, gallium α-chlorocrotonate, gallium β-chlorocrotonate, gallium γ-chlorocrotonate, gallium α-bromocrotonate, gallium β-bromocrotonate, gallium γ-bromocrotonate, gallium α,β-dichlorocrotonate, gallium α,β-dibromocrotonate, gallium γ,γ,γ-trichlorocrotonate, gallium methacrylate, gallium β-bromomethacrylate, gallium formate, gallium chloroformate, gallium cyclopentanecarboxylate, gallium 1-methylcyclopentanecarboxylate, gallium 2-methylcyclopentanecarboxylate, gallium 3-methylcyclopentanecarboxylate, gallium cyclohexanecarboxylate, gallium 1-methylcyclohexanecarboxylate, gallium 2-methylcyclohexanecarboxylate, gallium 3-methylcyclohexanecarboxylate, gallium 4-methylcyclohexanecarboxylate, gallium 1,3-dimethylcyclohexanecarboxylate, gallium 2,2-dimethylcyclohexanecarboxylate, gallium 2,4-dimethylcyclohexanecarboxylate, gallium 1-chlorocyclohexanecarboxylate, gallium 2-chlorocyclohexanecarboxylate, gallium 1-bromocyclohexanecarboxylate, gallium 2-bromocyclohexanecarboxylate, gallium 3-bromocyclohexanecarboxylate, gallium 1,2-dibromocyclohexanecarboxylate, gallium cyclohexylacetate, gallium 1-methylcyclohexylacetate, gallium 2,2-dimethylcyclohexylacetate, gallium 1-cyclohexenecarboxylate, gallium 2-cyclohexenecarboxylate, gallium 3-cyclohexenecarboxylate, gallium cycloheptanecarboxylate, gallium 1-cycloheptenecarboxylate, gallium cyclooctanecarboxylate, gallium 2-methylbenzoate, gallium 3-methylbenzoate, gallium 4-methylbenzoate, gallium 2-ethylbenzoate, gallium 3-ethylbenzoate, gallium 4-ethylbenzoate, gallium 2,3-dimethylbenzoate, gallium 2,4-dimethylbenzoate, gallium 2,5-dimethylbenzoate, gallium 2,6-dimethylbenzoate, gallium 3,4-dimethylbenzoate, gallium 3,5-dimethylbenzoate, gallium 2,3,4-trimethylbenzoate, gallium 2,3,5-trimethylbenzoate, gallium 2,3,6-trimethylbenzoate, gallium 2,4,6-trimethylbenzoate, gallium 3,4,5-trimethylbenzoate, gallium cuminate, gallium 2,3,4,5-tetramethylbenzoate, gallium 2,3,5,6-tetramethylbenzoate, gallium pentamethylbenzoate, gallium 2-chlorobenzoate, gallium cinnamate, gallium 2-cyanobenzoate, gallium naphthalene-1-carboxylate, gallium 2-methylnaphthalene-1-carboxylate, gallium 4-methylnaphthalene-1-carboxylate, gallium 5-methylnaphthalene-1-carboxylate, gallium 6-methylnaphthalene-1-carboxylate, gallium 7-methylnaphthalene-1-carboxylate, gallium 8-methylnaphthalene-1-carboxylate, gallium naphthalene-2-carboxylate, gallium 1-methylnaphthalene-2-carboxylate, gallium 4-methylnaphthalene-2-carboxylate, gallium 5-methylnaphthalene-2-carboxylate, gallium 6-methylnaphthalene-2-carboxylate, gallium 8-methylnaphthalene-2-carboxylate, gallium 5-chloronaphthalene-1-carboxylate, gallium 7-chloronaphthalene-1-carboxylate, gallium 8-chloronaphthalene-1-carboxylate, gallium 4-bromonaphthalene-1-carboxylate, gallium 5-bromonaphthalene-1-carboxylate, gallium 7-bromonaphthalene-1-carboxylate, gallium 8-bromonaphthalene-1-carboxylate, gallium 8-iodonaphthalene-1-carboxylate, gallium 1-chloronaphthalene-2-carboxylate, gallium 3-chloronaphthalene-2-carboxylate, gallium 5-chloronaphthalene-2-carboxylate, gallium 5-bromonaphthalene-2-carboxylate, gallium 3-iodonaphthalene-2-carboxylate, gallium benzenesulfonate, gallium 2-toluenesulfonate, gallium 3-toluenesulfonate, gallium 4-toluenesulfonate, gallium o-xylene-4-sulfonate, gallium m-xylene-4-sulfonate, gallium p-xylene-4-sulfonate, gallium 4-fluorobenzenesulfonate, gallium 2-chlorobenzenesulfonate, gallium 3-chlorobenzenesulfonate, gallium 4-chlorobenzenesulfonate, gallium 2,4-dichlorobenzenesulfonate, gallium 2-bromobenzenesulfonate, gallium 3-bromobenzenesulfonate, gallium 4-bromobenzenesulfonate, gallium 2,5-dibromobenzenesulfonate, gallium 3,4-dibromobenzenesulfonate, gallium 2-iodobenzenesulfonate, gallium 3-iodobenzenesulfonate, gallium 4-iodobenzenesulfonate, gallium methanesulfonate, gallium ethanesulfonate, gallium propanesulfonate, gallium butanesulfonate, gallium pentanesulfonate, gallium hexanesulfonate, gallium heptanesulfonate, gallium octanesulfonate, gallium trifluoromethanesulfonate, gallium pentafluoroethanesulfonate, gallium heptafluoropropanesulfonate, gallium perfluorobutanesulfonate, gallium perfluoropentanesulfonate, gallium perfluorohexanesulfonate, gallium perfluorooctanesulfonate, gallium perchlorate, and the anhydrides and hydrates of those salts.

Lewis Acid Metal Salt Containing Indium

Examples of the Lewis acid metal salt containing indium include indium monofluoroacetate, indium difluoroacetate, indium trifluoroacetate, indium monochloroacetate, indium dichloroacetate, indium trichloroacetate, indium monobromoacetate, indium dibromoacetate, indium tribromoacetate, indium monoiodoacetate, indiumdiiodoacetate, indium triiodoacetate, indium cyanoacetate, indium propionate, indium α-fluoropropionate, indium β-fluoropropionate, indium α,α'-difluoropropionate, indium α,β-difluoropropionate, indium β,β'-difluoropropionate, indium α-chloropropionate, indium β-chloropropionate, indium α,α'-dichloropropionate, indium α,β-dichloropropionate, indium β,β'-dichloropropionate, indium α-bromopropionate, indium β-bromopropionate, indium α,α'-dibromopropionate, indium α,β-dibromopropionate, indium α,α'-dibromopropionate, indium α-iodopropionate, indium β-iodopropionate, indium α,α'-diiodopropionate, indium α,β-diiodopropionate, indium β,β'-diiodopropionate, indium β,β,β-triiodopropionate, indium butyrate, indiumisobutyrate, indium valerate, indium caproate, indium heptanoate, indium caprylate, indium 2-ethylhexanoate, indium acrylate, indium α-fluoroacrylate, indium β-fluoroacrylate, indium α-chloroacrylate, indium β-chloroacrylate, indium α,β-dichloroacrylate, indium β-dichloroacrylate, indium α-bromoacrylate, indium β-bromoacrylate, indium α,β-dibromoacrylate, indium β,β'-dibromoacrylate, indium tribromoacrylate, indium α-iodoacrylate, indium β-iodoacrylate, indium α-diiodoacrylate, indium β,β'-diiodoacrylate, indium crotonate, indium α-chlorocrotonate, indium β-chlorocrotonate, indium γ-chlorocrotonate, indium α-bromocrotonate, indium β-bromocrotonate, indium γ-bromocrotonate, indium β-dichlorocrotonate, indium α,β-dibromocrotonate, indium γ,γ,γ-trichlorocrotonate, indium methacrylate, indium β-bromomethacrylate, indium formate, indium chloroformate, indium cyclopentanecarboxylate, indium 1-methylcyclopentanecarboxylate, indium 2-methylcyclopentanecarboxylate, indium 3-methylcyclopentanecarboxylate, indium cyclohexanecarboxylate, indium 1-methylcyclohexanecarboxylate, indium 2-methylcyclohexanecarboxylate, indium 3-methylcyclohexanecarboxylate, indium 4-methylcyclohexanecarboxylate, indium 1,3-dimethylcyclohexanecarboxylate, indium 2,2-dimethylcyclohexanecarboxylate, indium 2,4-dimethylcyclohexanecarboxylate, indium 1-chlorocyclohexanecarboxylate, indium 2-chlorocyclohexanecarboxylate, indium 1-bromocyclohexanecarboxylate, indium 2-bromocyclohexanecarboxylate, indium 3-bromocyclohexanecarboxylate, indium 1,2-dibromocyclohexanecarboxylate, indium cyclohexylacetate, indium 1-methylcyclohexylacetate, indium 2,2-dimethylcyclohexylaetate, indium 1-cyclohexenecarboxylate, indium 2-cyclohexenecarboxylate, indium 3-cyclohexenecarboxylate, indium cycloheptanecarboxylate, indium 1-cycloheptenecarboxylate, indium cyclooctanecarboxylate, indium 2-methylbenzoate, indium 3-methylbenzoate, indium 4-methylbenzoate, indium 2-ethylbenzoate, indium3-ethylbenzoate, indium4-ethylbenzoate, indium 2,3-dimethylbenzoate, indium 2,4-dimethylbenzoate, indium 2,5-dimethylbenzoate, indium 2,6-dimethylbenzoate, indium 3,4-dimethylbenzoate, indium 3,5-dimethylbenzoate, indium 2,3,4-trimethylbenzoate, indium 2,3,5-trimethylbenzoate, indium 2,3,6-trimethylbenzoate, indium 2,4,6-trimethylbenzoate, indium 3,4,5-trimethylbenzoate, indium cuminate, indium 2,3,4,5-tetramethylbenzoate, indium 2,3,5,6-tetramethylbenzoate, indium pentamethylbenzoate, indium 2-chlorobenzoate, indium cinnamate, indium 2-cyanobenzoate, indium naphthalene-1-carboxylate, indium 2-methylnaphthalene-1-carboxylate, indium 4-methylnaphthalene-1-carboxylate, indium 5-methylnaphthalene-1-carboxylate, indium 6-methylnaphthalene-1-carboxylate, indium 7-methylnaphthalene-1-carboxylate, indium 8-methylnaphthalene-1-carboxylate, indium naphthalene-2-carboxylate, indium 1-methylnaphthalene-2-carboxylate, indium 4-methylnaphthalene-2-carboxylate, indium 5-methylnaphthalene-2-carboxylate, indium 6-methylnaphthalene-2-carboxylate, indium 8-methylnaphthalene-2-carboxylate, indium 5-chloronaphthalene-1-carboxylate, indium 7-chloronaphthalene-1-carboxylate, indium 8-chloronaphthalene-1-carboxylate, indium 4-bromonaphthalene-1-carboxylate, indium 5-bromonaphthalene-1-carboxylate, indium 7-bromonaphthalene-1-carboxylate, indium 8-bromonaphthalene-1-carboxylate, indium 8-iodonaphthalene-1-carboxylate, indium 1-chloronaphthalene-2-carboxylate, indium 3-chloronaphthalene-2-carboxylate, indium 5-chloronaphthalene-2-carboxylate, indium 5-bromonaphthalene-2-carboxylate, indium 3-iodonaphthalene-2-carboxylate, indium benzenesulfonate, indium 2-toluenesulfonate, indium 3-toluenesulfonate, indium 4-toluenesulfonate, indium o-xylene-4-sulfonate, indium m-xylene-4-sulfonate, indium p-xylene-4-sulfonate, indium 4-fluorobenzenesulfonate, indium 2-chlorobenzenesulfonate, indium 3-chlorobenzenesulfonate, indium 4-chlorobenzenesulfonate, indium 2,4-dichlorobenzenesulfonate, indium 2-bromobenzenesulfonate, indium 3-bromobenzenesulfonate, indium 4-bromobenzenesulfonate, indium 2,5-dibromobenzenesulfonate, indium 3,4-dibromobenzenesulfonate, indium 2-iodobenzenesulfonate, indium 3-iodobenzenesulfonate, indium 4-iodobenzenesulfonate, indium methanesulfonate, indium ethanesulfonate, indium propanesulfonate, indium butanesulfonate, indium pentanesulfonate, indium hexanesulfonate, indium heptanesulfonate, indium octanesulfonate, indium trifluoromethanesulfonate, indium pentafluoroethanesulfonate, indium heptafluoropropanesulfonate, indium perfluorobutanesulfonate, indium perfluoropentanesulfonate, indium perfluorohexanesulfonate, indium perfluorooctanesulfonate, indium perchlorate, and the anhydrides and hydrates of these salts.

Lewis Acid Metal Salt Containing Thallium

Examples of the Lewis acid metal salt containing thallium include thallium acetate, thallium monofluoroacetate, thallium difluoroacetate, thallium trifluoroacetate, thallium monochloroacetate, thallium dichloroacetate, thallium trichloroacetate, thallium monobromoacetate, thallium dibromoacetate, thallium tribromoacetate, thallium monoiodoacetate, thallium diiodoacetate, thallium triiodoacetate, thallium cyanoacetate, thallium propionate, thallium α-fluoropropionate, thallium β-fluoropropionate, thallium α,α'-difluoropropionate, thallium α,β-difluoropropionate, thallium β,β'-difluoropropionate, thallium α-chloropropionate, thallium β-chloropropionate, thallium α,α'-dichloropropionate, thallium α,β-dichloropropionate, thallium β,'-dichloropropionate, thallium α-bromopropionate, thallium β-bromopropionate, thallium α,α'-dibromopropionate, thallium α,β-dibromopropionate, thallium β,β'-dibromopropionate, thallium α-iodopropionate, thallium β-iodopropionate, thallium α,α'-diiodopropionate, thallium α,β-diiodopropionate, thallium β,β'-diiodopropionate, thallium β,β,β'-triiodopropionate, thallium butyrate, thallium isobutyrate, thallium valerate, thallium caproate, thallium heptanoate, thallium caprylate, thallium 2-ethylhexanoate, thallium acrylate, thallium α-fluoroacrylate, thallium β-fluoroacrylate, thallium α-chloroacrylate, thallium β-chloroacrylate, thallium α,β-dichloroacrylate, thallium β,β'-dichloroacrylate, thallium α-bromoacrylate, thallium β-bromoacrylate, thallium α,β-dibromoacrylate, thallium β,β'-dibromoacrylate, thallium tribromoacrylate, thallium α-iodoacrylate, thallium β-iodoacrylate, thallium α,β-diiodoacrylate, thallium β,β'-diiodoacrylate, thallium crotonate, thallium α-chlorocrotonate, thallium β-chlorocrotonate, thallium γ-chlorocrotonate, thallium α-bromocrotonate, thallium β-bromocrotonate, thallium γ-bromocrotonate, thallium α,β-dichlorocrotonate, thallium α,β-dibromocrotonate, thallium γ,γ,γ-trichlorocrotonate, thallium methacrylate, thallium β-bromomethacrylate, thallium formate, thallium chloroformate, thallium cyclopentanecarboxylate, thallium 1-methylcyclopentanecarboxylate, thallium 2-methylcyclopentanecarboxylate, thallium 3-methylcyclopentanecarboxylate, thallium cyclohexanecarboxylate, thallium 1-methylcyclohexanecarboxylate, thallium 2-methylcyclohexanecarboxylate, thallium 3-methylcyclohexanecarboxylate, thallium 4-methylcyclohexanecarboxylate, thallium 1,3-dimethylcyclohexanecarboxylate, thallium 2,2-dimethylcyclohexanecarboxylate, thallium 2,4-dimethylcyclohexanecarboxylate, thallium 1-chlorocyclohexanecarboxylate, thallium 2-chlorocyclohexanecarboxylate, thallium 1-bromocyclohexanecarboxylate, thallium 2-bromocyclohexanecarboxylate, thallium 3-bromocyclohexanecarboxylate, thallium 1,2-dibromocyclohexanecarboxylate, thallium cyclohexylacetate, thallium 1-methylcyclohexylacetate, thallium 2,2-dimethylcyclohexylacetate, thallium 1-cyclohexenecarboxylate, thallium 2-cyclohexenecarboxylate, thallium 3-cyclohexenecarboxylate, thallium cycloheptanecarboxylate, thallium 1-cycloheptenecarboxylate, thallium cyclooctanecarboxylate, thallium 2-methylbenzoate, thallium 3-methylbenzoate, thallium 4-methylbenzoate, thallium 2-ethylbenzoate, thallium 3-ethylbenzoate, thallium 4-ethylbenzoate, thallium 2,3-dimethylbenzoate, thallium 2,4-dimethylbenzoate, thallium 2,5-dimethylbenzoate, thallium 2,6-dimethylbenzoate, thallium 3,4-dimethylbenzoate, thallium 3,5-dimethylbenzoate, thallium 2,3,4-trimethylbenzoate, thallium 2,3,5-trimethylbenzoate, thallium 2,3,6-trimethylbenzoate, thallium 2,4,6-trimethylbenzoate, thallium 3,4,5-trimethylbenzoate, thallium cuminate, thallium 2,3,4,5-tetramethylbenzoate, thallium 2,3,5,6-tetramethylbenzoate, thallium pentamethylbenzoate, thallium 2-chlorobenzoate, thallium cinnamate, thallium-2-cyanobenzoate, thallium naphthalene-1-carboxylate, thallium 2-methylnaphthalene-1-carboxylate, thallium 4-methylnaphthalene-1-carboxylate, thallium 5-methylnaphthalene-1-carboxylate, thallium 6-methylnaphthalene-1-carboxylate, thallium 7-methylnaphthalene-1-carboxylate, thallium 8-methylnaphthalene-1-carboxylate, thallium naphthalene-2-carboxylate, thallium 1-methylnaphthalene-2-carboxylate, thallium 4-methylnaphthalene-2-carboxylate, thallium 5-methylnaphthalene-2-carboxylate, thallium 6-methylnaphthalene-2-carboxylate, thallium 8-methylnaphthalene-2-carboxylate, thallium 5-chloronaphthalene-1-carboxylate, thallium 7-chloronaphthalene-1-carboxylate, thallium 8-chloronaphthalene-1-carboxylate, thallium 4-bromonaphthalene-1-carboxylate, thallium 5-bromonaphthalene-1-carboxylate, thallium 7-bromonaphthalene-1-carboxylate, thallium 8-bromonaphthalene-1-carboxylate, thallium 8-iodonaphthalene-1-carboxylate, thallium 1-chloronaphthalene-2-carboxylate, thallium 3-chloronaphthalene-2-carboxylate, thallium 5-chloronaphthalene-2-carboxylate, thallium 5-bromonaphthalene-2-carboxylate, thallium 3-iodonaphthalene-2-carboxylate, thallium benzenesulfonate, thallium 2-toluenesulfonate, thallium 3-toluenesulfonate, thallium 4-toluenesulfonate, thallium o-xylene-4-sulfonate, thallium m-xylene-4-sulfonate, thallium p-xylene-4-sulfonate, thallium 4-fluorobenzenesulfonate, thallium 2-chlorobenzenesulfonate, thallium 3-chlorobenzenesulfonate, thallium 4-chlorobenzenesulfonate, thallium 2,4-dichlorobenzenesulfonate, thallium 2-bromobenzenesulfonate, thallium 3-bromobenzenesulfonate, thallium 4-bromobenzenesulfonate, thallium 2,5-dibromobenzenesulfonate, thallium 3,4-dibromobenzenesulfonate, thallium 2-iodobenzenesulfonate, thallium 3-iodobenzenesulfonate, thallium 4-iodobenzenesulfonate, thallium methanesulfonate, thallium ethanesulfonate, thallium propanesulfonate, thallium butanesulfonate, thallium pentanesulfonate, thallium hexanesulfonate, thallium heptanesulfonate, thallium octanesulfonate, thallium trifluoromethanesulfonate, thallium pentafluoroethanesulfonate, thallium heptafluoropropanesulfonate, thallium perfluorobutanesulfonate, thallium perfluoropentanesulfonate, thallium perfluorohexanesulfonate, thallium perfluorooctanesulfonate, thallium perchlorate, and the anhydrides and hydrates of those salts.

Of the Lewis acid metal salts enumerated above, for example the metal salts hereinafter easily commercially available include zinc acetate, zinc p-toluenesulfonate, zinc trifluoroacetate, zinc trifluoromethanesulfonate, zinc perchlorate, zinc benzenesulfonate, zinc butyrate, zinc formate, zinc propionate, zinc acrylate, zinc methacrylate, zinc 2-ethylhexanoate, cadmium acetate, cadmium formate, cadmium perchlorate, mercury acetate, mercury formate, mercury perchlorate, aluminum acetate, aluminum formate, aluminum perchlorate, aluminum acrylate, aluminum methacrylate, gallium acetate, galliumperchlorate, gallium trifluoroacetate, indium perchlorate, indium trifluoroacetate, thallium acetate, thallium formate, thallium perchlorate and thallium trifluoroacetate. The other Lewis acid metal salts can also be synthesized according to conventional processes.

Examples of the synthesis techniques include (1) reaction of a metal oxide with an acid or acid anhydride, (2) reaction of a hydroxide with an acid or acid anhydride, (3) reaction of a carbonate with an acid or acid anhydride, (4) reaction of a metal halide with an acid or acid anhydride, (5) reaction of metal with an acid and (6) reaction of a metal alkoxide with an acid or acid anhydride.

The 2-cyanoacrylate composition of the present invention may contain only one Lewis acid metal salt or may contain a mixture of two or more Lewis acid metal salts. Preferred Lewis acid metal salts are salts of halogenoacetic acids with specific metals because those salts are especially effective in improving the clearance curability and surface curability of the 2-cyanoacrylate composition of the present invention. More preferred Lewis acid metal salts are salts of trihalogenoacetic acids with specific metals. Most preferred Lewis acid metal salts are zinc trifluoroacetate, cadmium trifluoroacetate, mercury trifluoroacetate, aluminum trifluoroacetate, gallium trifluoroacetate, indium trifluoroacetate and thallium trifluoroacetate.

The preferred range of the amount of the Lewis acid metal salt in the composition according to the present invention is from 0.1 ppm by weight to 1% by weight based on the weight of the 2-cyanoacrylate. If its amount is less than 0.1 ppm by weight, ability to accelerate the curing of the 2-cyanoacrylate is poor, and if its amount is more than 1% by weight, there is the possibility that storage stability of the 2-cyanoacrylate is greatly impaired. The more preferred range of the amount of the Lewis acid metal salt is from 1 to 500 ppm by weight. Where two or more Lewis acid metal salts are used, the concentration range is for the total amount of the Lewis acid metal salts used.

Compound Having Clathrating Ability

The compound having clathrating ability used in the present invention is a compound which is capable of including inorganic cations such as metal ions or hydronium ions or organic cations such as primary ammonium ions to thereby activate the counter anions and has conventionally been known as a curing accelerator for 2-cyanoacrylate compositions. Preferred examples of the compound are poly(alkylene oxide)s and derivatives thereof, crown ethers, silacrown ethers, Calixarenes, cyclodextrins and derivatives thereof, and pyrogallol-based cyclic compounds, because those compounds are effective in accomplishing the object of the present invention.

Poly(Alkylene Oxide)s and Derivatives Thereof

Examples of the poly(alkylene oxide)s and derivatives thereof are disclosed in, e.g., JP-B-60-37836, JP-B-1-43790, JP-A-63-128088, JP-A-3-167279, U.S. Pat. No. 4,386,193 and U.S. Pat. No. 4,424,327.

Preferred examples of the poly(alkylene oxide)s include diethylene glycol, triethylene glycol, tetraethylene glycol, polyethylene glycol, polypropylene glycol, poly-1,3-propylene glycol, poly(trimethylene oxide), poly(tetramethylene oxide), polyepichlorohydrin, poly(1,3-bis(chloromethyl)butylene oxide), polytetramethylene glycol, poly(1,3-dioxolane), poly(2,2-bis(chloromethyl)propylene oxide), ethylene oxide/propylene oxide block copolymers, polyglycerols such as diglycerol, triglycerol or tetraglycerol, formaldehyde condensates, acetaldehyde condensates, trioxane polymers and various poly(alkylene oxide)s commercially available as polyols for curing polyether type urethanes.

The poly(alkylene oxide) derivatives are represented by the esters of the poly (alkylene oxide)s enumerated above with acids and the ethers of the poly(alkylene oxide)s with hydroxy compounds. Although those compounds are preferred, the poly(alkylene oxide) derivatives are not particularly limited to those. Other examples thereof include compounds having a poly(alkylene oxide) structure in the molecule, such as ones having various substituents at the molecular ends and ones having other kinds of bonds in the poly(alkylene oxide).

Examples of the acids capable of forming the esters include acetic acid, propionic acid, butyric acid, isobutyric acid, pivalic acid, pentanoic acid, n-hexanoic acid, 2-methylpentanoic acid, n-octanoic acid, n-decanoic acid, lauric acid, palmitic acid, stearic acid, oleic acid, cyclohexylcarboxylic acid, cyclopentylcarboxylic acid, cyclopropylcarboxylic acid, acrylic acid, methacrylic acid, maleic acid, itaconic acid, naphthenic acid, benzoic acid, β-naphthylcarboxylic acid, p-toluenesulfonic acid, furancarboxylic acid, p-chlorobenzoic acid, monochloroacetic acid, cyanoacetic acid, adipic acid, sebacic acid, butanetetracarboxylic acid, aconitic acid, propane-1,2,3-tricarboxylic acid, citric acid, o-phthalic acid, isophthalic acid, trimellitic acid and pyromellitic acid.

Specific examples of the poly(alkylene oxide) esters include polyethylene glycol monoalkyl esters, polyethylene glycol diesters or polypropylene glycol diesters (e.g., acetate, trifluoroacetate, laurate, stearate, oleate, acrylate and methacrylate), bisphenol A/poly(alkylene oxide) adducts (examples of the alkylene include ethylene and propylene; the same applies hereinafter), hydrogenated bisphenol A/poly(alkylene oxide) adducts, trimethylolpropane/poly(alkylene oxide) adducts, glycerol/poly(alkylene oxide) adducts, polyoxyethylene-sorbitan esters, polyoxyethylene-sorbitan tetraoleate, adipic acid/poly(alkylene oxide) adducts, trimellitic acid/poly(alkylene oxide) adducts, isocyanate compound/poly(alkylene oxide) adducts, phosphoric acid/poly(alkylene oxide) adducts, silicic acid/poly(alkylene oxide) adducts and polyoxyalkylene polyphosphates.

Examples of the hydroxyl group-containing compounds capable of forming the ethers include methanol, ethanol, propanol, isobutanol, hexanol, cyclohexanol, 2-ethyloctanol, decanol, lauryl alcohol, cetyl alcohol, stearyl alcohol, oleyl alcohol, phenol, α-naphthol, β-naphthol, cresol, t-butylphenol, octylphenol, nonylphenol, p-chlorophenol, resol, bisphenol A, 2-chloroethanol, ethylene cyanohydrin, trifluoroethanol, benzyl alcohol, 1,4-butanediol, 1,6-hexanediol, glycerol, sorbitol, hydrogenated bisphenol A and trimethylolpropane.

Specific examples of the poly(alkylene oxide) ethers include diethylene glycol monoalkyl ethers, diethylene glycol dialkyl ethers, polyethylene glycol monoalkyl ethers (examples of the alkyls include methyl, ethyl, propyl, butyl, lauryl, cetyl, stearyl, oleyl and perfluoroalkyls), polyethylene glycol monoaryl ethers, polyethylene glycol dialkyl ethers, polypropylene glycol dialkyl ethers (examples of the alkyls include methyl, ethyl, propyl, and butyl), and polyethylene glycol diaryl ethers (examples of the aryls include phenyl, octylphenyl and nonylphenyl).

Crown Ethers

Examples of the crown ethers include those already disclosed in, e.g., JP-B-55-2236 and JP-A-3-167279. Preferred examples thereof include 15-crown-O-5, 18-crown-O-6, benzo-12-crown-O-4, benzo-15-crown-O-5, benzo-18-crown-O-6, dibenzo-18-crown-O-6, benzo-15-crown-O-5, dibenzo-24-crown-O-8, dibenzo-30-crown-O-10, tribenzo-18-crown-O-6, asym-dibenzo-22-crown-O-6, dibenzo-14-crown-O-4, dicyclohexyl-24-crown-O-8, cyclohexyl-12-crown-O-4, 1,2-decalyl-15-crown-O-5, 1,2-naphtho-15-crown-O-5, 3,4,5-naphthyl-16-crown-O-5, 1,2-methylbenzo-18-crown-O-6, 1,2-tert-butyl-18-crown-O-6, 1,2-vinylbenzo-15-crown-O-5 and 1,2-benzo-1,4-benzo-5-oxygen-20-crown-7.

Silacrown Ethers

Examples of the silacrown ethers are disclosed in, e.g., JP-A-60-168775. The examples include dimethylsila-11-crown-O-4, dimethylsila-14-crown-O-5 and dimethylsila-17-crown-O-6.

Calixarenes

Examples of the Calixarenes are disclosed in, e.g., JP-A-60-179482, JP-A-62-235379 and JP-A-63-88152. The examples include compounds represented by formula (1):

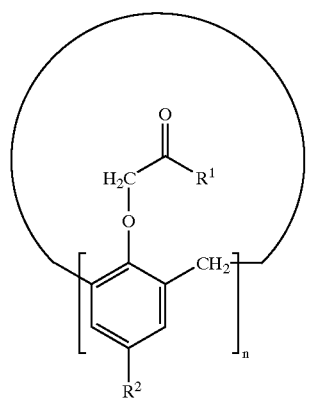

(1)

wherein $R^1$ represents alkyl, alkoxy, substituted alkyl or substituted alkoxy, $R^2$ represents H or alkyl, and n is 4, 6 or 8.

Cyclodextrins

Examples of the cyclodextrins are disclosed in, e.g., JP-W-5-505835. The examples include α-, β- and/or γ-cyclodextrins represented by formula (2):

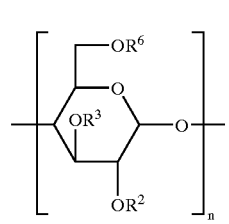

(2)

wherein $R^2$, $R^3$ and $R^6$ which may be the same or different each represent hydrogen atom, alkyl group, alkylene group, cycloalkyl group, alkylaryl group, acyl group, trialkylsilyl group or urethane group, provided that all of $R^2$, $R^3$ and $R^6$ are not hydrogen atom; and n is 6, 7 or 8.

Pyrogallol-Based Cyclic Compounds

Examples of the pyrogallol-based cyclic compounds include compounds represented by formula (3), which are disclosed in Japanese Patent Application No. 10-375121. Preferred examples thereof include 3,4,5,10,11,12,17,18,19,24,25,26,-dodecaethoxycarbomethoxy-C-1,C-8,C-15,C-22-tetramethyl[14]-metacyclophane.

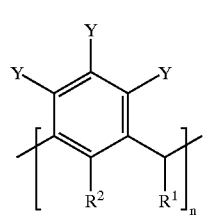

(3)

where Y's each represent hydrogen atom, OH or OR (wherein R is a substituent not initiating polymerization of 2-cyanoacrylate), provided that at least one of the Y's is OR and at least one of the remaining Y's is OH or OR; n is an even number of 4 or larger; $R^1$ represents hydrogen atom or methyl group; and $R^2$ represents a substituent not initiating polymerization of 2-cyanoacrylate.

Such compounds having clathrating ability according to the present invention may be used alone or as a mixture of two or more thereof to the 2-cyanoacrylate.

Of those compounds having clathrating ability, crown ethers are generally preferable because those have high effect to improve the clearance curability and surface curability of the 2-cyanoacrylate composition. Specific examples of the preferred compounds having high effect to improve the clearance curability and surface curability of the 2-cyanoacrylate composition are polyethylene glycol, polyethylene glycol monoacrylate, polyethylene glycol diacrylate, polyethylene glycol monomethacrylate, polyethylene glycol dimethacrylate, 18-crown-O-6, benzo-18-crown-O-6, 4-tert-butylcalix[(4]arene-0,0',0",0'''-tetraacetic acid tetraethyl ester and 3,4,5,10,11,12,17,18,19,24,25,26,-dodecaethoxycarbomethoxy-C-1,C-8,C-15,C-22-tetramethyl[14]-metacyclophane.

The amount of the compound having clathrating ability added is preferably from 10 ppm by weight to 10% by weight, more preferably from 100 ppm by weight to 1% by weight, based on the weight of the 2-cyanoacrylate composition. If its amount is less than 10 ppm by weight, it is difficult to impart sufficient rapid-curing properties to the 2-cyanoacrylate composition, and if its amount is more than 10% by weight, storage stability of the composition considerably lowers. Where two or more compounds having clathrating ability are used, its concentration range is for the total amount of those compounds used.

2-Cyanoacrylate

The 2-cyanoacrylate serving as the main component of the 2-cyanoacrylate composition of the present invention is one ordinarily used in cyanoacrylate-based adhesives and the like.

Examples of the 2-cyanoacrylate include methyl 2-cyanoacrylate, ethyl 2-cyanoacrylate, propyl 2-cyanoacrylate, isopropyl 2-cyanoacrylate, butyl 2-cyanoacrylate, isobutyl 2-cyanoacrylate, amyl 2-cyanoacrylate, hexyl 2-cyanoacrylate, cyclohexyl 2-cyanoacrylate, octyl 2-cyanoacrylate, 2-ethylhexyl 2-cyanoacrylate, allyl 2-cyanoacrylate, propargyl 2-cyanoacrylate, phenyl 2-cyanoacrylate, benzyl 2-cyanoacrylate, methoxyethyl 2-cyanoacrylate, ethoxyethyl 2-cyanoacrylate, tetrahydrofurfuryl 2-cyanoacrylate, 2-chloroethyl 2-cyanoacrylate, 3-chloropropyl 2-cyanoacrylate, 2-chlorobutyl 2-cyanoacrylate, 2,2,2-trifluoroethyl 2-cyanoacrylate and hexafluoroisopropyl 2-cyanoacrylate.

Those 2-cyanoacrylates may be used alone or as a mixture of two or more thereof in the 2-cyanoacrylate composition of the present invention. Of those 2-cyanoacrylates, the 2-cyanoacrylic esters with lower alkyls having 1 to 4 carbon atoms are advantageous in that use of such 2-cyanoacrylates provides high effect to enhance the surface curability and clearance curability, the improvement of which is the object of the present, invention.

Other Ingredients

The 2-cyanoacrylate composition of the present invention comprises a Lewis acid metal salt, a compound having clathrating ability and a 2-cyanoacrylate as essential ingredients. However, one or more of ingredients such as a stabilizer for anionic polymerization, a stabilizer for radical polymerization, a thickener, a curing accelerator, a plasticizer and a thixotropic agent may be added to the composition according to need when the composition is used as an adhesive, a potting material or a filler.

Examples of the stabilizer for anionic polymerization include sulfurous acid gas, nitrogen monoxide, hydrogen fluoride, sulfone compounds, $BF_3$/ether complexes, $BF_3$/acetic acid complex, $BF_3$/methanol complex, methanesulfonic acid, p-toluenesulfonic acid and scandium trifluoromethanesulfonate. The amount of the stabilizer added is preferably from 1 ppm by weight to 1% by weight based on the weight of the 2-cyanoacrylate composition.

Examples of the stabilizer for radical polymerization include hydroquinone, hydroquinone monomethyl ether, catechol and pyrogallol. The amount of the stabilizer added is preferably from 1 ppm by weight to 1% by weight based on the weight of 2-cyanoacrylate composition.

Examples of the thickener include poly(methyl methacrylate), copolymers of methyl methacrylate and an acrylic ester, copolymers of methyl methacrylate and another methacrylic ester and cellulose derivatives. The amount of the thickener added is preferably from 0.1 to 20% by weight based on the weight of the 2-cyanoacrylate composition.

Examples of the plasticizer include dioctyl phthalate and dibutyl phthalate. The amount of the plasticizer added is preferably from 0.01 to 30% by weight based on the weight of the 2-cyanoacrylate composition.

Examples of the thixotropic agent include hydrophobic silica. The amount of the thixotropic agent added is preferably from 0.1 to 20% by weight based on the weight of the 2-cyanoacrylate composition.

Ingredients other than the above-described ingredients may further be added according to purposes. Examples of such further ingredients include adhesion promoters, dyes, perfumes, fillers, crosslinking agents, tougheners and organic solvents.

When the 2-cyanoacrylate composition of the present invention is used as a potting material, a filler or a instantaneous adhesive, it can cure in a short period of time even in a relatively wide gap between adherends or on a surface onto which the composition has overflowed. Although the reasons for this effect have not been elucidated, the following is presumed. The Lewis acid metal salt according to the present invention forms a complex with a 2-cyanoacrylate and thus lowers the β-position electron density in the 2-cyanoacrylate to thereby enable the anionic polymerization to proceed more readily. However, when the Lewis acid metal salt is used alone, such a use alone has no effect because the salt itself is an acidic substance. The metal salt hence functions to accelerate the curing only when it is used in combination with a compound having clathrating ability.

The present invention will be explained in more detail by reference to the following Examples and Comparative Examples, but the invention should not be construed as being limited to those Examples.

The following evaluation method was used.

Clearance Setting Time (Clearance Curability)

A polyethylene plate having a recess having a diameter of 6 mm and a depth of 0.5 mm was used as a base after a few drops of DOP (dioctyl phthalate) were dropped into the recess in order to prevent adhesive leakage through a gap at the bottom of a test piece. A cylindrical test piece made of aluminum which weighed 100 g and had a hole having a diameter of 6.95 mm and a depth of 20 mm was placed on this polyethylene plate. A cylindrical pin made of aluminum having a diameter of 6.55 mm and a height of 40 mm was placed in the hole so as not to be in contact with the inner wall of the test piece.

A 2-cyanoacrylate composition was poured into the space between the test piece and the pin. After allowing to stand those for a given period of time, the pin was held and lifted up. The time required for the test piece to be lifted up together with the pin was taken as the clearance setting time.

The 2-cyanoacrylate composition according to the present invention is widely used as a cyanoacrylate instantaneous adhesive to adhere various materials such as glasses, metals, plastics, rubbers, woods, potteries, papers and woven fabrics in various industrial fields such as electronic and electric fields, automobile fields and wood processing fields; medical fields, leisure fields and general household fields.

Further, the 2-cyanoacrylate composition is used as potting materials or fillers in mainly electronic and electric fields.

For example, the 2-cyanoacrylate composition is used to adhere a part and a main body or adhere at least two parts to form an article. Further, the 2-cyanoacrylate composition is used to fill depressions on a surface and then cure the same to form an article.

EXAMPLE 1

Aluminum acetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 2

Aluminum formate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 3

Aluminum benzoate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 1
(Synthesis of Aluminum Monochloroacetate)

The target compound was synthesized by the method described in P. K. Bhattacharya et al., *Indian Journal of Chemistry*, Vol.28A (September 1989), p.779. In dry benzene was dissolved 1.62 g (0.01 mol) of aluminum triisopropoxide. While stirring the resulting solution at room temperature, 19 g (0.20 mol) of monochloroacetic acid was added dropwise thereto. This addition resulted in a temperature increase. After completion of the dropwise addition, the resulting mixture was heated to 100 to 120° C. and refluxed for 18 hours, and then cooled to room temperature. The solvent, by-product isopropyl monochloroacetate and monochloroacetic acid remaining unreacted were distilled off under vacuum to obtain a white powder, which was subjected to elemental analysis and infrared spectrometry. As a result, this powder was found to be nearly pure aluminum monochloroacetate.

EXAMPLE 4

Aluminum monochloroacetate and 18-crown-O-6were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 2
(Synthesis of Aluminum Dichloroacetate)

Aluminum dichloroacetate was synthesized according to Synthesis Example 1.

EXAMPLE 5

Aluminum dichloroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 3
(Synthesis of Aluminum Trichloroacetate)

Aluminum trichloroacetate was synthesized according to Synthesis Example 1.

EXAMPLE 6

Aluminum trichloroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 4
(Synthesis of Aluminum Methanesulfonate)

Aluminum methanesulfonate was synthesized according to Synthesis Example 1.

EXAMPLE 7

Aluminum methanesulfonate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 5
(Synthesis of Aluminum Trifluoroacetate)

Aluminum trifluoroacetate was synthesized according to Synthesis Example 1.

EXAMPLE 8

Aluminum trifluoroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 9

Aluminum trifluoroacetate and 4-tert-butylCalix[4]arene-0,0',0",0'"-tetraacetic acid tetraethyl ester were mixed with ethyl 2-cyanoacrylate in amounts such that the amounts thereof became 10 ppm by weight and 1% by weight, respectively, to prepare an adhesive composition. This composition was subjected to the evaluation. The results obtained are shown in Table 1.

EXAMPLE 10

Aluminum trifluoroacetate and 3,4,5,10,11,12,17,18,19,24,25,26-dodecaethoxycarbomethoxy-C-1,C-8,C-15,C-22-tetramethyl[14]-metacyclophane were mixed with ethyl 2-cyanoacrylate in amounts such that the amounts thereof became 10 ppm by weight and 1% by weight, respectively, to prepare an adhesive composition. This composition was subjected to the evaluation. The results obtained are shown in Table 1.

SYNTHESIS EXAMPLE 6
(Synthesis of Gallium Trifluoroacetate)

The target compound was synthesized by the method described in Peter Sartori et al., *Journal of Fluorine Chemistry*, 1 (1971/72), p.463. In a round bottom flask from which moisture had been completely eliminated was placed 1.76 g (0.01 mol) of gallium chloride. 20 cc (0.25 mol) of trifluoroacetic acid was gradually added dropwise to the flask. Immediately upon initiation of the dropwise addition, a white fume generated and heat generation occurred. After completion of the dropwise addition, the reaction mixture was stirred and heated for further 140 hours at 60 to 70° C. The reaction mixture was then cooled to room temperature and the volatile ingredients were completely distilled off under vacuum to obtain a light-yellow powder, which was subjected to elemental analysis and infrared spectrometry. As a result, this powder was found to be nearly pure gallium trifluoroacetate.

EXAMPLE 11

Gallium trifluoroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

SYNTHESIS EXAMPLE 7
(Synthesis of Indium Trifluoroacetate)

The target compound was synthesized by the method described in Peter Sartori et al., *Journal of Fluorine Chemistry*, 1 (1971/72), p.463. In a round-bottomed flask from which moisture had been completely eliminated was placed 1.15 g (0.01 mol) of indium. 39 cc (0.50 mol) of trifluoroacetic acid was gradually added dropwise to the flask. This mixture was stirred at room temperature for 3 days. As a result, the indium ingot had disappeared and a white precipitate had generated. The volatile ingredients were completely distilled off under vacuum to obtain a white powder, which was subjected to elemental analysis and infrared spectrometry. As a result, this powder was found to be nearly pure indium trifluoroacetate.

EXAMPLE 12

Indium trifluoroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 13

Thallium trifluoroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 14

Thallium trifluoroacetate and PEG 1,000 were mixed with ethyl 2-cyanoacrylate in amounts such that the amounts thereof became 10 ppm and 2,000 ppm by weight, respectively, to prepare an adhesive composition. This composition was subjected to the evaluation. The results obtained are shown in Table 1.

EXAMPLE 15

Thallium trifluoroacetate and PEG 1,000 dimethacrylate were mixed with ethyl 2-cyanoacrylate in amounts such that the amounts thereof became 10 ppm and 2,000 ppm by weight, respectively, to prepare an adhesive composition. This composition was subjected to the evaluation. The results obtained are shown in Table 1.

EXAMPLE 16

Zinc trifluoromethanesulfonate hydrate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 17

Zinc trifluoromethanesulfonate hydrate and PEG 1,000 were mixed with ethyl 2-cyanoacrylate in amounts such that the amounts thereof became 10 ppm and 2,000 ppm by weight, respectively, to prepare an adhesive composition. This composition was subjected to the evaluation. The results obtained are shown in Table 1.

EXAMPLE 18

Zinc trifluoromethanesulfonate hydrate and PEG 1,000 dimethacrylate were mixed with ethyl 2-cyanoacrylate in amounts such that the amounts thereof became 10 ppm and 2,000 ppm by weight, respectively, to prepare an adhesive composition. This composition was subjected to the evaluation. The results obtained are shown in Table 1.

EXAMPLE 19

Cadmium acetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 20

Mercury trifluoroacetate and 18-crown-O-6 were mixed with ethyl 2-cyanoacrylate in amounts such that the amounts thereof became 10 ppm and 500 ppm by weight, respectively, to prepare an adhesive composition. This composition was subjected to the evaluation. The results obtained are shown in Table 1.

EXAMPLE 21

Aluminum trifluoroacetate and PEG 1,000 dimethacrylate were mixed with isopropyl 2-cyanoacrylate in amounts such that the amounts thereof became 10 ppm and 2,000 ppm by weight, respectively, to prepare an adhesive composition. This composition was subjected to the evaluation. The results obtained are shown in Table 1.

EXAMPLE 22

Aluminum trifluoroacetate and 18-crown-O-6 were mixed with isopropyl 2-cyanoacrylate in amounts such that the amounts thereof became 10 ppm and 500 ppm by weight, respectively, to prepare an adhesive composition. This composition was subjected to the evaluation. The results obtained are shown in Table 1.

COMPARATIVE EXAMPLE 1

An adhesive composition was prepared with ethyl 2-cyanoacrylate which does not contain a Lewis acid metal salt and a host compound capable of forming a clathrate compound with a metal as a guest. This composition was subjected to the evaluation. The results obtained are shown in Table 1.

COMPARATIVE EXAMPLE 2

An adhesive composition was prepared with isopropyl 2-cyanoacrylate which does not contain a Lewis acid metal salt and a host compound capable of forming a clathrate compound with a metal as a guest. This composition was subjected to the evaluation. The results obtained are shown in Table 1.

COMPARATIVE EXAMPLE 3

PEG 1,000 was mixed with ethyl 2-cyanoacrylate in an amount such that the amount thereof became 2,000 ppm by weight to prepare an adhesive composition. This composition was subjected to the evaluation. The results obtained are shown in Table 1.

COMPARATIVE EXAMPLE 4

PEG 1,000 dimethacrylate was mixed with ethyl 2-cyanoacrylate in an amount such that the amount thereof became 2,000 ppm by weight to prepare an adhesive composition. This composition was subjected to the evaluation. The results obtained are shown in Table 1.

COMPARATIVE EXAMPLE 5

PEG 1,000 dimethacrylate was mixed with isopropyl 2-cyanoacrylate in an amount such that the amount thereof became 2,000 ppm by weight to prepare an adhesive composition. This composition was subjected to the evaluation. The results obtained are shown in Table 1.

COMPARATIVE EXAMPLE 6

18-Crown-O-6 was mixed with isopropyl 2-cyanoacrylate in an amount such that the amount thereof became 500 ppm by weight to prepare an adhesive composition. This composition was subjected to the evaluation. The results obtained are shown in Table 1.

COMPARATIVE EXAMPLE 7

18-Crown-O-6 was mixed with ethyl 2-cyanoacrylate in an amount such that the amount thereof became 500 ppm by weight to prepare an adhesive composition. This composition was subjected to the evaluation. The results obtained are shown in Table 1.

COMPARATIVE EXAMPLE 8

4-tert-ButylCalix[4]arene-0,0',0",0'"-tetraacetic acid tetraethyl ester was mixed with ethyl 2-cyanoacrylate in an amount such that the amount thereof became 1% by weight to prepare an adhesive composition. This composition was subjected to the evaluation. The results obtained are shown in Table 1.

COMPARATIVE EXAMPLE 9

3,4,5,10,11,12,17,18,19,24,25,26-Dodecaethoxycarbomethoxy-C-1,C-8,C-15,C-22-tetramethyl[14]-metacyclophane was mixed with ethyl 2-cyanoacrylate in an amount such that the amount thereof became 1% by weight to prepare an adhesive composition. This composition was subjected to the evaluation. The results obtained are shown in Table 1.

COMPARATIVE EXAMPLE 10

Aluminum trifluoroacetate was mixed with ethyl 2-cyanoacrylate in an amount such that the amount thereof became 10 ppm by weight to prepare an adhesive composition. This composition was subjected to the evaluation. The results obtained are shown in Table 1.

COMPARATIVE EXAMPLE 11

Thallium trifluoroacetate was mixed with ethyl 2-cyanoacrylate in an amount such that the amount thereof became 10 ppm by weight to prepare an adhesive composition. This composition was subjected to the evaluation. The results obtained are shown in Table 1.

TABLE 1

|  | Setting time |
|---|---|
| Example 1 | 7 min |
| Example 2 | 7 min |
| Example 3 | 8 min |
| Example 4 | 7 min |
| Example 5 | 7 min |
| Example 6 | 7 min |
| Example 7 | 9 min |
| Example 8 | 4 min |
| Example 9 | 4 min |
| Example 10 | 8 min |
| Example 11 | 5 min |
| Example 12 | 5 min |
| Example 13 | 3 min |
| Example 14 | 5 min |
| Example 15 | 6 min |
| Example 16 | 4 min |
| Example 17 | 10 min |
| Example 18 | 7 min |
| Example 19 | 7 min |
| Example 20 | 7 min |
| Example 21 | 10 min |
| Example 22 | 9 min |
| Comparative Example 1 | 24 min |
| Comparative Example 2 | 30 min |
| Comparative Example 3 | 17 min |
| Comparative Example 4 | 18 min |
| Comparative Example 5 | 16 min |
| Comparative Example 6 | 15 min |
| Comparative Example 7 | 13 min |
| Comparative Example 8 | 17 min |
| Comparative Example 9 | 15 min |
| Comparative Example 10 | 25 min |
| Comparative Example 11 | 38 min |

APPLICATION EXAMPLE 1

In producing input and output leading wires by adhering PVC coated wire and a PVC-made connector, there is 0.2 mm clearance between the wire and a socket on the connector portion. When the conventional 2-cyanoacrylate adhesive (viscosity: 100 mP·s) was used to adhere those, the assembly was required to be allowed to stand for at least 2 minutes. Thus, this adhering operation could not be put on the production line.

On the other hand, when the adhesive comprising the 2-cyanoacrylate composition of the present invention was used, the adhesive set for 60 seconds. Thus, the adhering operation could be put on the production line, and working efficiency was greatly improved.

The adhesives used are as follows.
Conventional 2-cyanoacrylate Adhesive
    Main component: Ethyl-2-cyanoacrylate
    18-Crown-O-6: 100 ppm
    Thickener: PMMA, 2%
2-Cyanoacrylate Composition of the Present Invention
    Main component: Ethyl-2-cyanoacrylate
    Aluminum trifluoroacetate: 50 ppm
    18-Crow-O-6: 100 ppm
    Thickener: PMMA (polymethyl methacrylate), 2%

APPLICATION EXAMPLE 2

In adhering PVC-made break hose and a urethane-made fixture, there is 0.5 mm clearance therebetween. When those was adhered using the conventional 2-cyanoacrylate adhesive, it took about 20 minutes or more. Thus, productivity was poor.

On the other hand, when the adhesive comprising the 2-cyanoacrylate composition of the present invention was used, the adhesive set for about 8 minutes. Thus, working efficiency was greatly improved.

The adhesives used are as follows.
Conventional 2-cyanoacrylate Adhesive
  Main component: Ethyl-2-cyanoacrylate
  18-Crown-O-6: 200 ppm
  Thickener: PMMA, 2%
2-Cyanoacrylate Composition of the Present Invention
  Main component: Ethyl-2-cyanoacrylate
  Aluminum trifluoroacetate: 40 ppm
  18-Crown-0-6: 200 ppm
  Thickener: PMMA, 2%

APPLICATION EXAMPLE 3

In filling and adhering a space (0.2 mm clearance) between tenon and joggle on a wood plate without using a nail, use of the conventional gel-like 2-cyanoacrylate adhesive required 30 minutes or more. Thus, productivity was poor.

On the other hand, when the adhesive comprising the 2-cyanoacrylate composition of the present invention was used, the adhesive set for about 10 minutes. Thus, working efficiency was greatly improved.

The adhesives used are as follows.
Conventional 2-cyanoacrylate Adhesive
  Main component: Ethyl-2-cyanoacrylate
  PEG 1000: 2,000 ppm
  Thickener: PMMA, 1%
  Hydrophobic silica: 5%
2-Cyanoacrylate Composition of the Present Invention
  Main component: Ethyl-2-cyanoacrylate
  PEG 1000: 2,000 ppm
  Thickener: PMMA, 1%
  Aluminum trifluoroacetate: 70 ppm
  Hydrophobic silica: 5%

As described above, the 2-cyanoacrylate composition of the present invention has excellent clearance curability and surface curability. The composition can hence be used in a wider range of industrial and domestic applications. In particular, since the composition can bond adherends to each other in a short period of time even when the gap therebetween is relatively wide, it is free from the problem of sufficiently cleaning or polishing adherend surfaces beforehand. As a result, the time required for bonding operation is considerably shortened and the operating efficiency is greatly increased. Even where the composition is used by general consumers having a poor knowledge about bonding, it can be easily applied because there is no need of paying attention to the gap or to an overflowed part of the composition during the bonding operation. Therefore, the composition has remarkable effects on various industries.

What is claimed is:

1. A 2-cyanoacrylate composition comprising:
   (1) a Lewis acid metal salt which comprises a metal selected from the group consisting of zinc, cadmium, mercury, aluminum, gallium, indium and thallium, and a conjugate base comprising an acid having oxygen, wherein the metal is bonded to the conjugate base through an oxygen atom, wherein said Lewis acid metal salt is a salt of the metal and a halogenated acetic acid, and
   (2) a compound having clathrating ability.

2. A 2-cyanoacrylate composition comprising:
   (1) a Lewis acid metal salt which comprises a metal selected from the group consisting of zinc, cadmium, mercury, aluminum, gallium, indium and thallium, and a conjugate base comprising an acid having oxygen, wherein the metal is bonded to the conjugate base through an oxygen atom, wherein said Lewis acid metal salt is a salt of the metal and a trihalogenated acetic acid, and
   (2) a compound having clathrating ability.

3. A 2-cyanoacrylate composition comprising:
   (1) a Lewis acid metal salt selected from the group consisting of zinc trifluoroacetate, cadmium trifluoroacetate, mercury trifluoroacetate, gallium trifluoroacetate, indium trifluoroacetate and thallium trifluoroacetate, and
   (2) a compound having clathrating ability.

4. The 2-cyanoacrylate composition as claimed in any one of claims 1, 2 or 3, wherein the compound having clathrating ability is one selected from the group consisting of poly(alkylene oxide)s and derivatives thereof, crown ethers, silacrown ethers, Calixarenes, cyclodextrins and derivatives thereof, and pyrogallol-based cyclic compounds.

5. The 2-cyanoacrylate composition as claimed in any one of claims 1, 2 or 3, wherein the amount of the Lewis acid metal salt is 0.1 ppm by weight to 1% by weight based on the weight of the 2-cyanoacrylate.

6. The 2-cyanoacrylate composition as claimed in any one of claims 1, 2 or 3, wherein said compound having clathrating ability is crown ethers.

7. The 2-cyanoacrylate composition as claimed in any one of claims 1, 2 or 3, wherein said compound having clathrating ability is selected from the group consisting of polyethylene glycol, polyethylene glycol monoacrylate, polyethylene glycol diacrylate, polyethylene glycol monomethacrylate, polyethylene glycol dimethacrylate, 18-crown-O-6, benzo-18-crown-O-6, 4-tert-butylCalix[4]arene-0,0',0",0'"-tetraacetic acid, tetraethyl ester and 3,4,5,10,11,12,17,18,19,24,25,26,-dodecaethoxycarbomethoxy-C-1,C-8,C-15,C-22-tetramethyl[14]-metacyclophane.

8. The 2-cyanoacrylate composition as claimed in any one of claims 1, 2 or 3, or wherein the amount of the compound having clathrating ability is 10 ppm by weight to 10% by weight based on the weight of the 2-cyanoacrylate composition.

9. The 2-cyanoacrylate composition as claimed in any one of claims 1, 2 or 3, wherein the amount of the compound having clathrating ability is 100 ppm by weight to 1% by weight based on the weight of the 2-cyanoacrylate composition.

10. The 2-cyanoacrylate composition as claimed in any one of claims claim 1, 2 or 3, wherein the amount of the Lewis acid metal salt is 1 to 500 ppm by weight based on the weight of the 2-cyanoacrylate.

11. An article comprising a part and a main body, adhered using the 2-cyanoacrylate composition as claimed in any one of claims 1, 2 or 3.

12. An article having depressed portions on the surface thereof, said depressed portions being filled and adhered with the 2-cyanoacrylate composition as claimed in any one of claims 1, 2 or 3.

* * * * *